United States Patent
Ulybin

(10) Patent No.: US 8,942,244 B2
(45) Date of Patent: Jan. 27, 2015

(54) CIRCUIT AND METHOD OF AUTONOMOUS FOIP/MOIP/TOIP CALL ESTABLISHMENT

(75) Inventor: Vladimir Ulybin, Rishon Lezion (IL)

(73) Assignee: AudioCodes Ltd., Lod (IL)

( * ) Notice: Subject to any disclaimer, the term of this patent is extended or adjusted under 35 U.S.C. 154(b) by 2226 days.

(21) Appl. No.: 11/585,253

(22) Filed: Oct. 24, 2006

(65) Prior Publication Data

US 2008/0095145 A1    Apr. 24, 2008

(51) Int. Cl.
*H04L 12/28* (2006.01)
*H04L 12/66* (2006.01)
*H04N 1/327* (2006.01)

(52) U.S. Cl.
CPC .......... *H04L 12/66* (2013.01); *H04N 1/32719* (2013.01)
USPC .......... 370/401; 370/276; 370/296; 370/353; 370/355; 370/356; 370/357; 370/391; 370/395.5; 370/395.63; 370/395.64; 370/395.65; 370/467; 370/469; 370/493

(58) Field of Classification Search
None
See application file for complete search history.

(56) References Cited

U.S. PATENT DOCUMENTS

| 7,609,646 B1* | 10/2009 | Qi et al. ........................ 370/252 |
| 7,907,708 B2* | 3/2011 | Walker et al. .............. 379/93.09 |
| 2003/0123466 A1* | 7/2003 | Somekh et al. .............. 370/401 |
| 2004/0059823 A1* | 3/2004 | Garakani et al. ............. 709/230 |

OTHER PUBLICATIONS

RFC 4612, Real-Time Facsimile, by Jones F. published in Aug. 2006.*
ITU-T Recommendation T.38 (Apr. 2004), Procedures for real-time Group 3 facsimile communication over IP networks.
ITU-T Recommendation V.150.1 (Jan. 2003), Procedures for the end-to-end connection of V•seriedDCEs over an IP network.
ITU-T Recommendation V.150.1 Amendment 1 (Jan. 2005), Modification to SSE reason identifier codes to support voice band data and text relay.
ITU-T Recommendation V.152 (Jan. 2005), Procedures for supporting Voice-Band Data over IP Networks.

\* cited by examiner

*Primary Examiner* — Faruk Hamza
*Assistant Examiner* — Aixa A Guadalupe
(74) *Attorney, Agent, or Firm* — Eitan, Mehulal & Sadot

(57) ABSTRACT

Disclosed are new methods of fax-over-IP (FoIP), modem-over-IP (MoIP) or text-over-IP (ToIP) call establishment based on detecting a combination of contra-propagating signals from calling and answering terminals for autonomous connection of media gateways.

18 Claims, 6 Drawing Sheets

CIRCUIT AND METHOD OF AUTONOMOUS FOIP/MOIP/TOIP CALL ESTABLISHMENT

FIELD OF THE INVENTION

The present invention relates generally to communication systems and more particularly to methods and apparatus of establishing communication.

BACKGROUND OF THE INVENTION

Media gateways (MG) allow analog terminal equipment (for example, telephones, facsimiles, telephone modems, textphones, etc.) to communicate over digital packet networks. A regular gateway usually is connected to PSTN (Public Switched Telephone Network) terminal equipment via an analog signal interface and is linked to IP network via a packet interface.

A normal voice-over-IP (VoIP) path of voice signals through the gateway comprises of: (1) a near speaker audio signal is sampled and entered the gateway via signal interface, (2) the input sample stream is cleared of echo and forwarded to a speech encoder for compression, (3) the compressed stream is packetized and transmitted to the IP network via packet interface, (4) packets received by gateway from IP, are de-packetized and forwarded through de-jitter (play out) buffer to a speech decoder, (5) the decoder de-compresses the received bit stream and (6) sends the output signal samples to the gateway signal interface.

Turning now to FIG. 1, there is shown an exemplary embodiment of a communication link according to the prior-art as explained hereinabove.

Non-speech signals may pass through a gateway over different paths. For example, modem signals may pass a gateway via a voice-band-data (VBD) path using low compression codecs, or may be relayed by means of modem termination or modem-over-IP (MoIP) method. Fax calls usually pass through gateways via a fax relay or fax-over-IP (FoIP) path including a fax demodulation/modulation processing, a FoIP packetization and other special processing.

Gateways supporting both fax-over-IP (FoIP) and voice-over-IP (VoIP) calls establish a connection in voice mode. The signals transferred over IP in voice or voice-band-data mode, are encoded by voice/VBD encoder and played by means of voice/VBD decoder. Traditional procedures of fax/modem call discrimination are based on detecting fax/modem signals at voice encoder side. This detection corresponds to the signal propagation in direction from fax/modem terminal equipment to IP network. The ITU-T Recommendations T.38, V.150.1, V.152 and V.151 define fax/modem/textphone signals which may be used as stimuli of transitioning to FoIP, MoIP, VBD and ToIP operation.

Traditional gateways initiate a transition from voice to fax relay (FoIP) when a fax signal is detected at a sample input of the gateway (it is a voice encoder side). Communicating gateways may setup FoIP call with the help of media gateway controller (MGC) or autonomously without any negotiation in real time.

In case of MGC management, a gateway reports all signals detected to MGC. The MGC performs a call discrimination taking into account detection events received from near and remote gateways. The MGC management introduces transition delays and involves additional (MGC level) protocols not required during fax relay. Currently, the MGC procedures are defined for regular fax relay call setups (fax rates up to 14.4 kbps) but are not available for V.34 fax relay. The MGC transitioning method is not considered in this invention, but this does not mean that the invention methods or autonomous behavior of invention gateway cannot be used in MGC environment.

In a more reliable case, when MGC's are not involved, gateways may require a MG-to-MG signaling protocol for a time of call discrimination. The goal of MG-to-MG signaling protocol is to allow a gateway staying in VoIP or VBD mode to make a call discrimination with the help of MG-to-MG information about signals detected by a remote gateway from a connected terminal equipment. It is obvious, that a gateway making the autonomous call discrimination and call establishment depends on MG-to-MG signaling capabilities and performance of a remote gateway. There is a need in the field of communication for improved methods and circuits for autonomous call establishment between Media Gateways.

SUMMARY OF THE INVENTION

According to some embodiments of the present invention, there is provided a bi-directional gateway, which gateway may include (1) a data network communication module, (2) a circuit switched communication module, (3) bi-directional monitor of signals received from and transmitted to a terminal equipment, and (4) a controller and/or media gateway, which controller and/or media gateway is adapted to (1) cause communication handshake signal, received from a terminal equipment through said circuit switched communication module to be forwarded to the data network through a data network communication module and (2) to cause a handshake reply signal received from data network through said data network communication module to be forwarded to the terminal equipment through said circuit switched communication module.

According to some embodiments of the present invention, the gateway may be connected to fax/modem/textphone terminal equipment (TE) via analog signal interface and linked to data network via a packet interface.

According to some embodiments of the present invention, the gateway may open a call in VoIP and/or VBD mode. According to some further embodiments of the present invention, the gateway may use an SSE protocol (auxiliary part of VBD) for better interoperability with a remote gateway.

According to further embodiments of the present invention, if the gateway doesn't use the SSE protocol, it may perform transitioning between states by switching packet payload types or destination ports. According to yet further embodiments of the present invention, when the gateway operates in voice or VBD mode, the gateway does not require any type of MG-to-MG signaling protocol.

According to some embodiments of the present invention, the gateway may discriminate between fax/modem/textphone calls using signals from the "calling" TE side and from the "answering" TE side. According to some embodiments of the present invention, the gateway, when in VoIP or VBD mode, may be able to detect (monitor) the fax or modem signals in two contra-propagating directions.

From terminal equipment (TE).
the data network.

According to some embodiments of the present invention, these contra propagating signals may be detected half-duplex or full-duplex.

According to some embodiments of the present invention, the gateway may analyze signals received from TE (directing to the data network) before RTP encoding for IP and signals received from the data network after RTP decoding.

According to some further embodiments of the present invention, the gateway may enter a XoIP (FoIP/MoIP/ToIP)

state on completion of fax/modem call discrimination based on signal monitoring in two contra-propagating directions.

According to some embodiments of the present invention, the stimulus of switching from VoIP or VBD to XoIP (FoIP/MoIP/ToIP) mode may be a combination of (1) a signal detected on RTP encoder side (in direction from TE) and (2) a signal detected on RTP decoder side (in direction from network).

According to some embodiments of the present invention, the gateway may initiate a transition from VoIP to VBD state by detecting a regular stimulus signal on RTP encoder side (directed from TE) or RTP decoder side (directed from data network). A fax/modem/textphone signal detected in reverse direction may be used for configuring an appropriate VBD signal/packet processing.

According to some embodiments of the present invention, when transitioning to VBD or XoIP (FoIP/MoIP/ToIP), the gateway may re-generate the standard fax/modem signal. According to yet further embodiments of the present invention, the re-generation may be based on signal parameters (for example, volume, phase or demodulated data) detected before or during the transition.

According to some embodiments of the present invention, the re-generated signal may replace a decoded signal received from data network or a signal which is to be encoded and forwarded to data network. According to some further embodiments of the present invention, the re-generation process may be continued until the call establishment is accomplished, this results in avoiding a possible fax/modem disconnection due to signal irregularities (like carrier drops, gain hits, phase mismatches, etc.) caused by a gateway state transition. Any methods known today or to be devised in the future for signal re-generation may be applicable to the present invention.

According to some embodiments of the present invention, when the gateway detects fax/modem/textphone signal at the output of a VoIP decoder of a stream, which stream may have been received from a network, the gateway may re-generate the detected signal towards a connected TE in order to eliminate signal distortions caused by speech compression. According to some further embodiments of the present invention, the re-generation process may be performed, for example, when a gateway switches from VoIP to VBD state.

According to some embodiments of the present invention, when the gateway transitions to XoIP (FoIP/MoIP/ToIP) mode, it may generate a new synthetic signal (including possible silence) instead of transmitting or re-generating the received signal. The synthetic signal may be transmitted at nominal (pre-configured) level and may have different parameters from original signal.

According to some embodiments of the present invention, by performing the bi-directional signal monitoring and packet processing, the gateway is fully autonomous, due to its ability to discriminate and establish fax, modem, or textphone calls without the help of MGC controller or auxiliary MG-to-MG signaling protocols. Additionally, the gateway is fully autonomous in the sense of independency on signaling detection capabilities and a type of a remote gateway, which may be a regular gateway or the invention based gateway.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
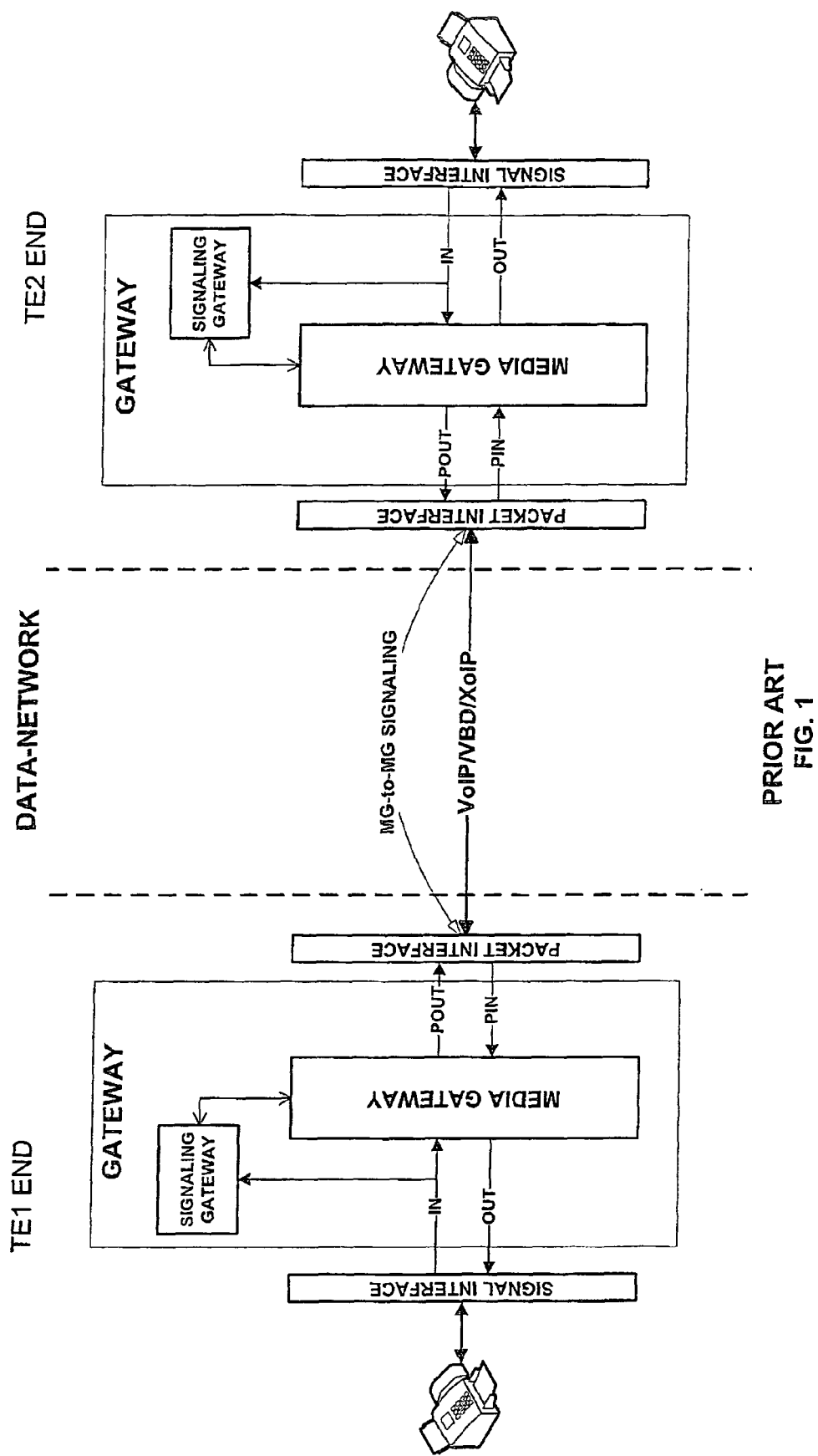
FIG. 1 shows a block diagram of an exemplary communication link between two typical gateways in accordance with the prior art. The gateways use a MG-to-MG signaling protocol for autonomous transitioning from VoIP or VBD transfer to XoIP (FoIP/MoIP/ToIP) relay.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein. One of ordinary skill in the art should understand that the described invention may be used for all kinds of wireless or wire-line system.

According to some embodiments of the present invention, there is provided a bi-directional gateway, which gateway may include (1) a data network communication module, (2) a circuit switched communication module, (3) bi-directional monitor of signals received from and transmitted to a terminal equipment, and (4) a controller or media gateway adapted to cause communication handshake signal received from a terminal equipment through said circuit switched communication module to be forwarded to the IP through data network communication module and to cause a handshake reply signal received from IP through said data network communication module to be forwarded to the terminal equipment through said circuit switched communication module.

According to some embodiments of the present invention, the gateway may be connected to fax/modem/textphone terminal equipment (TE) via analog signal interface and linked to data network via a packet interface.

According to some embodiments of the present invention, the gateway may open a call in VoIP and/or VBD mode. According to some further embodiments of the present invention, the gateway may use SSE protocol (auxiliary part of VBD) for better interoperability with a remote gateway.

According to further embodiments of the present invention, if the gateway doesn't use the SSE protocol, it may perform transitioning between states by switching packet payload types or destination ports. According to yet further embodiments of the present invention, when the gateway operates in voice or VBD mode, the gateway does not require any type of MG-to-MG signaling protocol.

According to some embodiments of the present invention, the gateway may discriminate between fax/modem/textphone calls using signals from the "calling" TE side and from the "answering" TE side. According to some embodiments of the present invention, the gateway, when in VoIP or VBD mode, may be able to detect (monitor) the fax or modem signals in two contra-propagating directions:

From terminal equipment (TE).
From the data network.

According to some embodiments of the present invention, these contra propagating signals may be detected half-duplex or full-duplex.

According to some embodiments of the present invention, the gateway may analyze signals received from TE (directing to the data network) before RTP encoding for IP and signals received from the data network after RTP decoding.

According to some further embodiments of the present invention, the gateway may enter a XoIP (FoIP/MoIP/ToIP) state on completion of fax/modem call discrimination based on signal monitoring in two contra-propagating directions.

According to some embodiments of the present invention, the stimulus of switching from VoIP or VBD to XoIP (FoIP/MoIP/ToIP) mode may be a combination of (1) a signal detected on RTP encoder side (in direction from TE) and (2) a signal detected on RTP decoder side (in direction from network).

According to some embodiments of the present invention, the gateway may initiate a transition from VoIP to VBD state by detecting a regular stimulus signal on RTP encoder side (directed from TE) or RTP decoder side (directed from data network). A fax/modem/textphone signal detected in reverse direction may be used for configuring an appropriate VBD signal/packet processing, for example, to enable or disable VBD echo canceling, to setup VBD codec, packet redundancy level, etc.

According to some embodiments of the present invention, when transitioning to XoIP (FoIP/MoIP/ToIP), the gateway may re-generate the standard fax/modem signal. According to yet further embodiments of the present invention, the re-generation may be based on signal parameters (for example, volume, phase or demodulated data) detected before/during the transition.

According to some embodiments of the present invention, the re-generated signal may replace a decoded signal received from data network or a signal, which signal is to be encoded and forwarded to data network. According to some further embodiments of the present invention, the re-generation process may be continued, this results in avoiding a possible fax/modem disconnection due to signal irregularities (like carrier drops, gain hits, phase mismatches, etc.) caused by a gateway state transition. Any methods known today or to be devised in the future for signal re-generation may be applicable to the present invention.

According to some embodiments of the present invention, when the gateway detects a fax/modem/textphone signal at the output of a VoIP decoder of a stream, which stream may have been received from the network, the gateway may re-generate the detected signal towards a connected TE in order to eliminate signal distortions caused by speech compression. According to some further embodiments of the present invention, the re-generation process may be performed, for example, when a gateway switches from VoIP to VBD state.

According to some embodiments of the present invention, when the gateway transitions to XoIP (FoIP/MoIP/ToIP) mode, it may generate a new synthetic signal (including possible silence) instead of transmitting or re-generating the received signal. The synthetic signal may be transmitted at nominal (pre-configured) level and may have different parameters from original signal.

According to some embodiments of the present invention, by performing the bi-directional signal monitoring and packet processing, the gateway is fully autonomous, because it is able to discriminate and establish fax, modem, or textphone calls without help of MGC controller or auxiliary MG-to-MG signaling protocols. The gateway is fully autonomous also in the sense of independency on signaling detection capabilities and a type of a remote gateway, which may be a regular gateway or the invention based gateway. To disable the use of MG-to-MG signaling protocols, the invention gateway, may ignore a negotiation of MG-to-MG signaling capabilities at a stage of opening network session.

Figure 2:
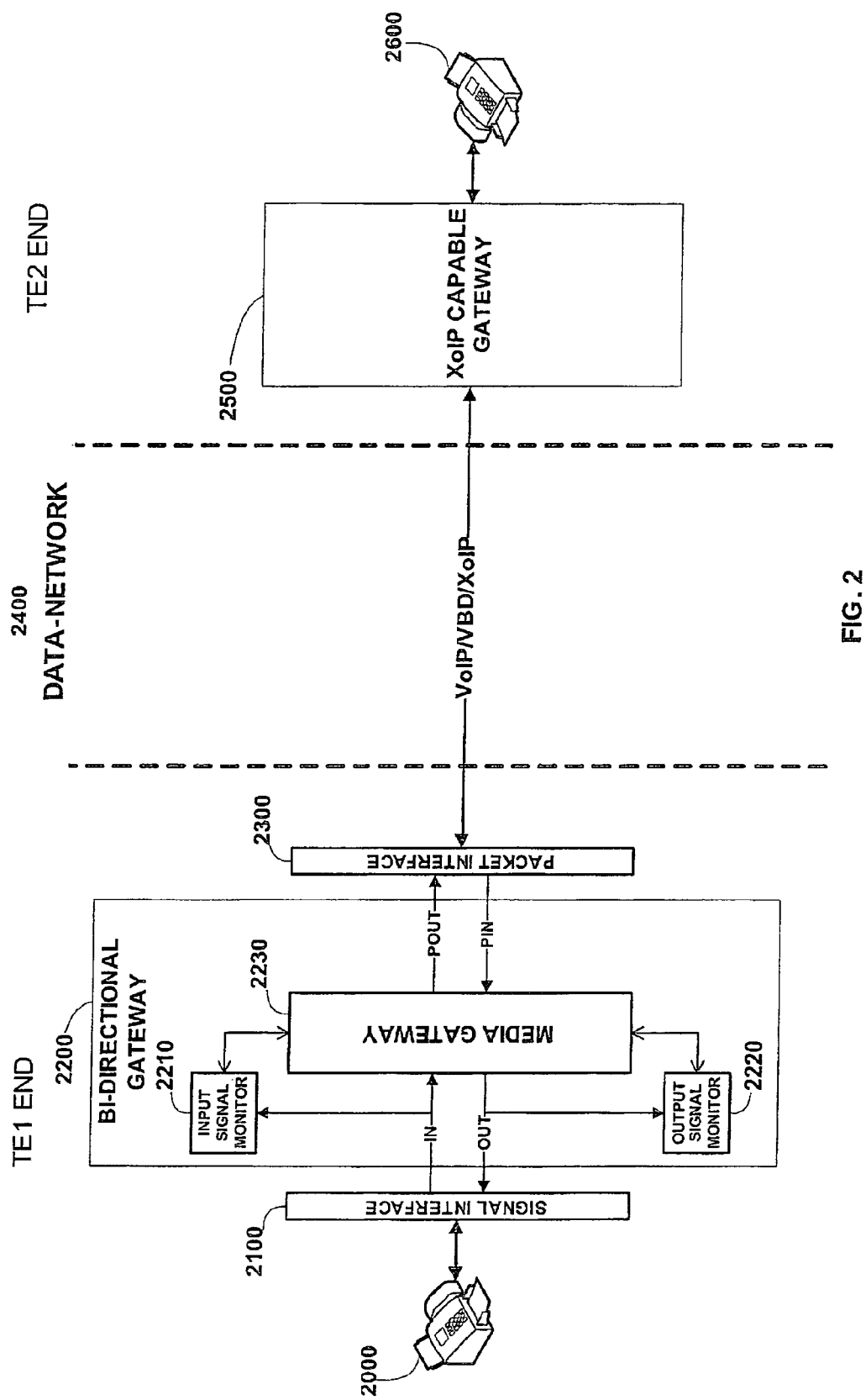
FIG. 2 shows a block diagram of an exemplary communication link between a typical gateway (TE2 side) with disabled MG-to-MG signaling and an autonomous gateway (TE1 side) in accordance with some embodiments of the present invention.

Turning now to FIG. 2, there is shown a block diagram of a communication module according to some embodiments of the present invention. The communication module may comprise: (1) a Terminal Equipment (TE) 2000 (e.g. telephones, facsimiles, telephone modems, textphones etc.), (2) a signal interface unit 2100, (3) a Bi-Directional gateway 2200, which gateway is in TE1 END, (4) a packet interface 2300, (5) a data network 2400, (6) a gateway 2500 in TE2 END, which gateway may be of any type that supports one or more XoIP protocol, signal and packet interfaces at TE2 END (not shown), and (7) Terminal Equipment 2600. According to further embodiments of the present invention, the communication module may additionally comprise at TE2 END a signal and/or packet interface.

According to some embodiments of the present invention, the Bi-Directional gateway 2200 may comprise of: (1) media gateway 2230 supporting a set of XoIP protocols intersecting with a set of XoIP protocols available on a remote gateway 2500, (2) a monitor 2210 of signals received from near TE 2000, (3) a monitor 2220 of signals played out by VoIP/VBD decoder toward the near TE 2000.

According to some embodiments of the present invention, the operation of the Bi-Directional gateway 2200 may be described in conjunction with the steps of the flow charts shown in FIG. 3, FIG. 4, FIG. 5, and FIG. 6, which flowcharts include the steps of a method of establishing a XoIP connection.

According to some embodiments of the present invention, remote gateway 2500 may be a call server or any other apparatus working over the network.

According to some embodiments of the present invention, FIGS. 3, 4, 5 and 6 refer to some different scenarios during which the invention gateway autonomously initiates a XoIP (FoIP/MoIP/ToIP) call and forces a remote gateway to respond on the selected protocol. The scenario when a remote gateway initiates a XoIP session first is not considered here because the gateway behavior in this case is typical for any other gateways: on detecting XoIP stream from the network, the gateway switches to XoIP protocol immediately. The scenarios given by FIGS. 3, 4, 5, 6 and corresponding descriptions define some general principles of a new method of XoIP call establishment. Exact steps and scenarios may vary depending on actual network delay, type of terminal equipment and other reasons.

Figure 3:
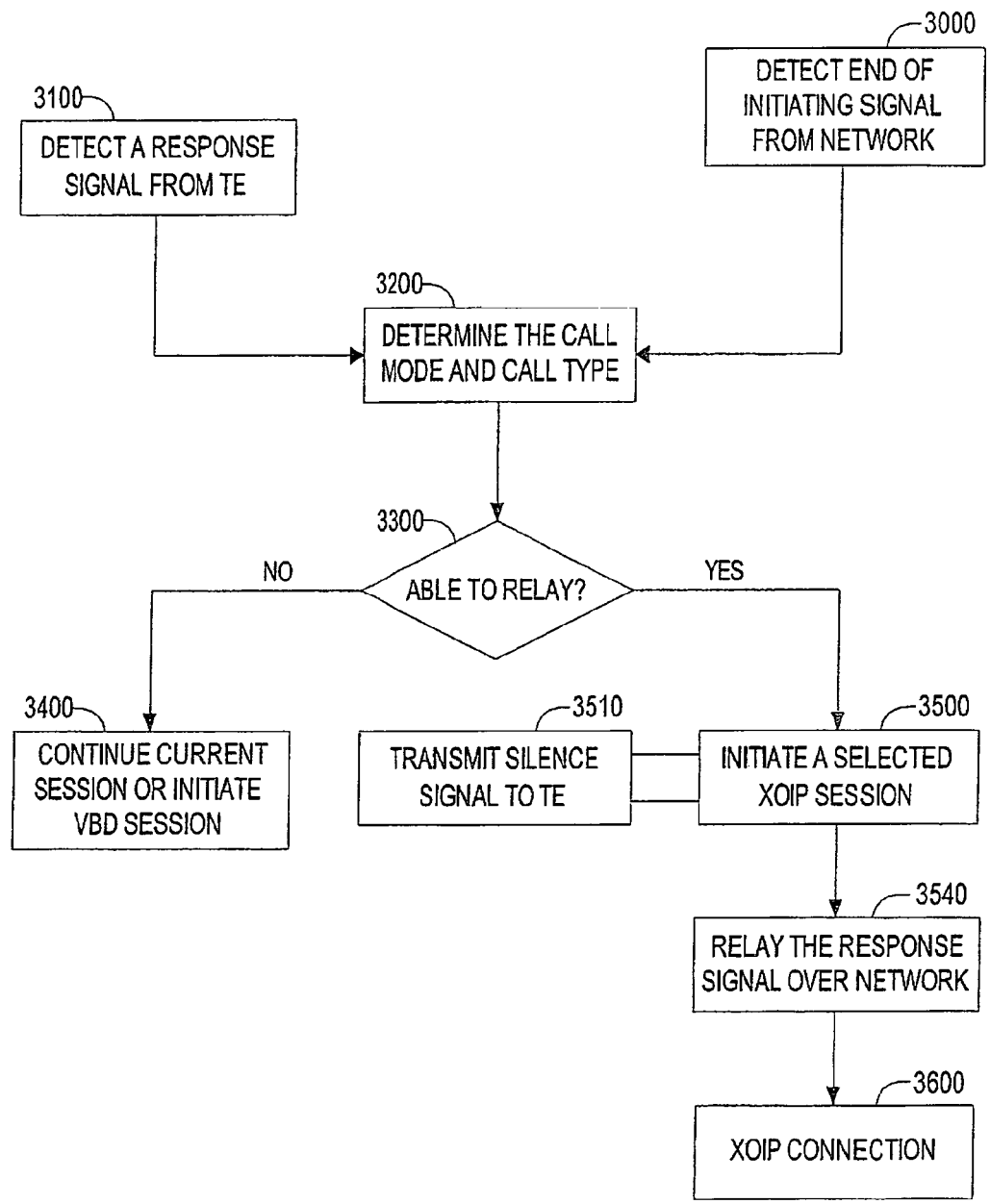
FIG. 3 is a flowchart including the steps of a method of establishing a XoIP call during half-duplex communication handshake for invention gateway connected to a terminal equipment (TE) responding on a signal initiating the handshake, in accordance with some embodiments of the present invention.

Turning now to FIG. 3 there is shown the steps of establishing a XoIP (FoIP/MoIP/ToIP) call during half-duplex communication handshake for invention gateway connected to a terminal equipment (TE) responding on a signal initiating the handshake. According to some embodiments of the present invention, gateway 2200 while monitoring the output signal (unit 2220) toward TE 2000, may detect a communication handshake initiating signal received from the data network (FIG. 3 step 3000). According to some further embodiments of the present invention, the handshake initiating signal may be received from the network (2400) in VoIP/VBD mode via a packet interface (2300).

According to some embodiments of the present invention, gateway 2200 while monitoring the input signal (unit 2210) may detect a response signal from TE (FIG. 3 step 3100). According to some further embodiments of the present invention, the response signal may be received from TE 2000 via a signal interface (2100).

According to some embodiments of the present invention, in the event that gateway 2200 detects the end of handshake initiating signal from the network and a response signal from TE, the gateway may determine the call mode and call type.

According to some embodiments of the present invention, the call mode may be answering/originating (for example, the call is originating if a fax/modem calling tone has been transmitted to answering fax/modem TE connected to the gateway). According to further embodiments of the present invention, the call type may be fax/modem/text/voice (for example, the call type is fax or modem if corresponding CNG or V.25 CT signals were detected from the data network).

According to some embodiments of the present invention, gateway 2200 may take a decision about relaying the call according to the call parameters (FIG. 3 step 3300). According to further embodiments of the present invention, if gateway 2200 is unable to relay a complete call then the gateway will continue the current operation in VoIP/VBD mode or initiate a communication session in VBD mode (step 3400). According to further embodiments of the present invention, if gateway 2200 is capable to relay the call it may initiate a communication session according to the selected XoIP protocol (step 3500). The same time, the gateway starts to transmit a silence to TE (step 3510). The detected response signal may be relayed over the network (2400) to a remote gateway (2500) by using the initiated XoIP protocol (step 3540). At the stage of a regular procedure of XoIP connection (step 3600), the gateway waits for a XoIP stream from a remote gateway while continuing a local signal exchange with TE. The XoIP call establishment is completed on receiving a XoIP stream from the network.

Figure 4:
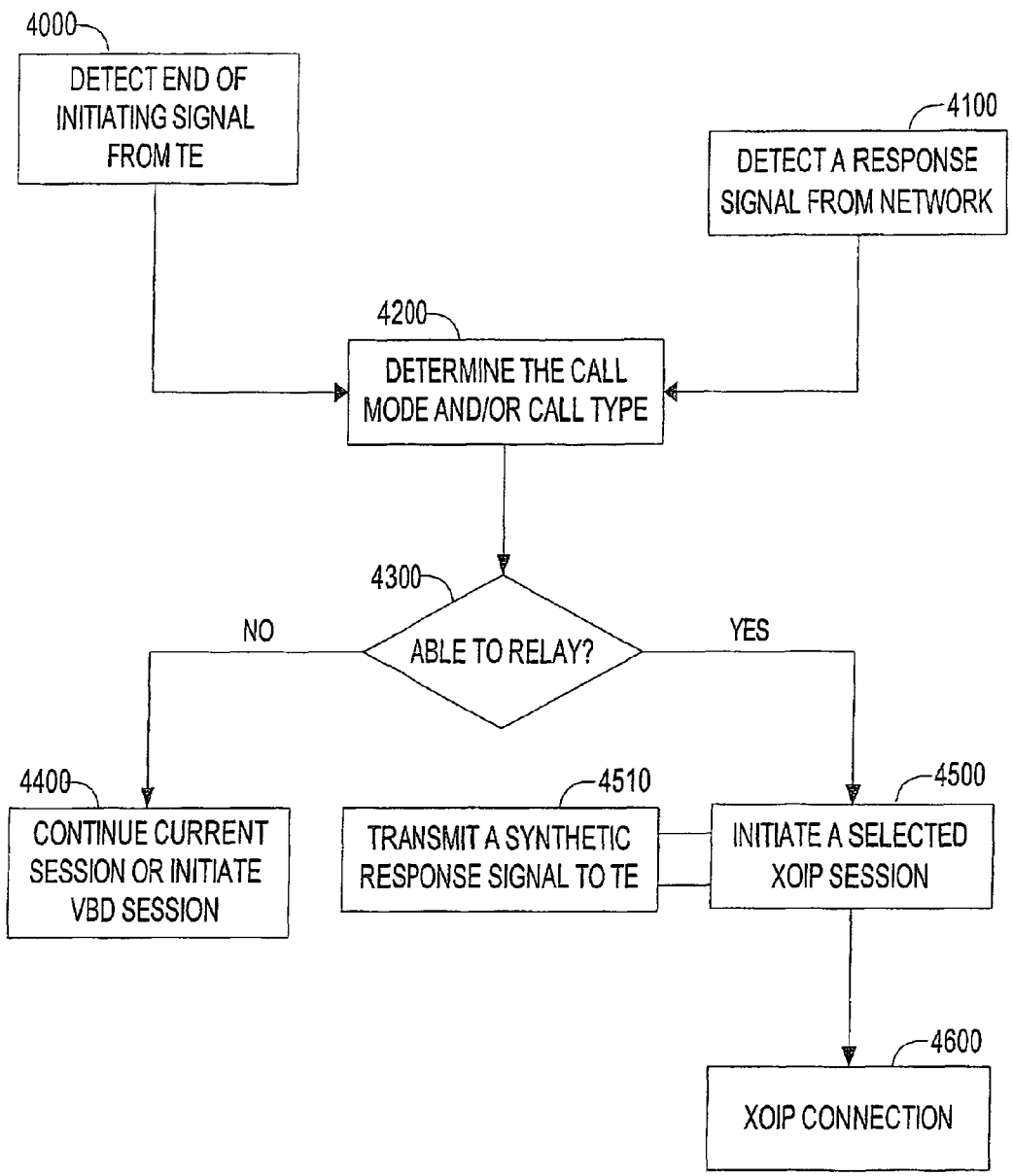
FIG. 4 is a flowchart including the steps of a method of establishing a XoIP call during half-duplex communication handshake for invention gateway connected to a terminal equipment (TE) initiating the handshake in accordance with some embodiments of the present invention.

Turning now to FIG. 4 there is shown the steps of establishing a XoIP (FoIP/MoIP/ToIP) call during half-duplex communication handshake for invention gateway connected to a terminal equipment (TE) initiating the handshake. According to some embodiments of the present invention, gateway 2200 monitoring (2210) the input signal may detect a handshake initiating signal received from the TE (FIG. 4 step 4000). According to some further embodiments of the present invention, the initiating signal may be received from TE 2000 via a signal interface (2100).

According to some embodiments of the present invention, gateway 2200 monitoring (2220) the output signal may detect a response signal from a data network (FIG. 4 step 4100). According to some further embodiments of the present invention, the response signal may be received from the network 2400 in VoIP/VBD mode via a packet interface (2300).

According to some embodiments of the present invention, in the event that gateway 2200 detects the end of initiating signal from TE and a response signal from the network, the gateway may determine the call mode and call type.

According to some embodiments of the present invention, the call mode may be answering/originating (for example, the call is answering if fax/modem answer tone is being transmitted to calling fax/modem TE connected to the gateway). According to further embodiments of the present invention, the call type may be fax/modem/text/voice (for example, the call type is fax or modem if corresponding CNG or V.25 CT signals were detected from TE).

According to some embodiments of the present invention, gateway 2200 may take a decision about relaying the call according to the call parameters (FIG. 4 step 4300). According to further embodiments of the present invention, if gateway 2200 is unable to relay a complete call then the gateway will continue the current operation in VoIP/VBD mode or initiate a communication session in VBD mode (step 4400). According to further embodiments of the present invention, if gateway 2200 is capable to relay the call it may initiate a communication session according to the selected XoIP protocol (step 4500).

According to some embodiments of the present invention, during the transition to XoIP state, gateway 2200 may synthetically re-generate the response signal or transmit a new response (step 4510) instead of original response signal transferred over the network. According to some embodiments of the present invention, re-generating response signal may help avoiding a possible fax/modem disconnection due to any signal irregularities (for example, carrier drops, gain hits, phase mismatches) which may be caused by transitions between gateway states. Continuing the response transmission to TE, the gateway executes a XoIP connection procedure (step 4600) similarly to the procedure 3600 described above.

Figure 5:
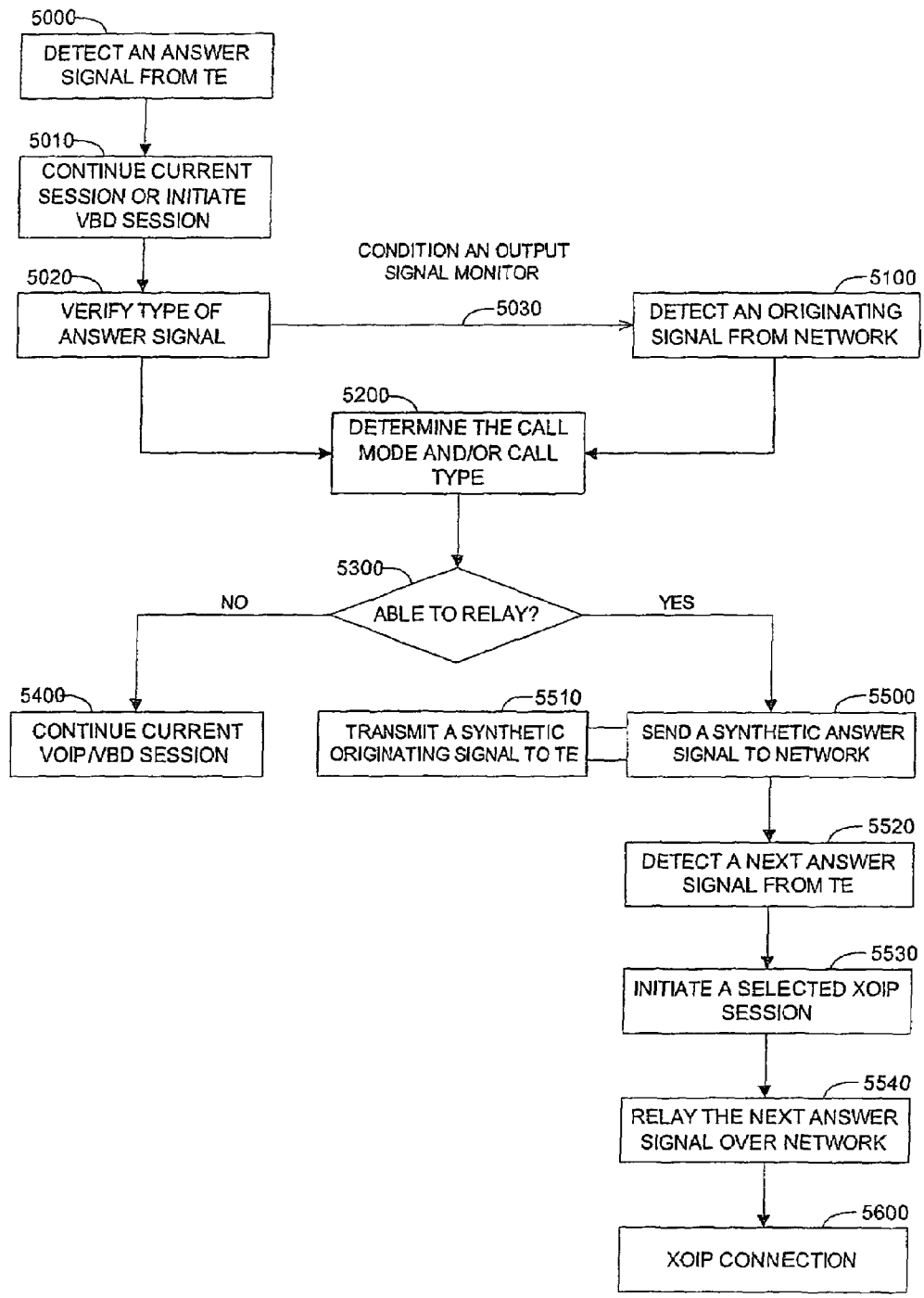
FIG. 5 is a flowchart including the steps of a method of establishing a XoIP (FoIP/MoIP/ToIP) call during full-duplex communication handshake for invention gateway connected to an answering terminal equipment (TE) in accordance with some embodiments of the present invention.

Turning now to FIG. 5 there is shown the steps of establishing a XoIP (FoIP/MoIP/ToIP) call during full-duplex communication handshake for invention gateway connected to answering terminal equipment (TE). According to some embodiments of the present invention, the gateway 2200 monitoring (2210) the input signal may detect an answer signal received from TE (FIG. 5 step 5000). According to some further embodiments of the present invention, gateway 2200 may initiate a VBD transfer mode (step 5010).

According to some embodiments of the present invention, gateway 2200 may verify the type of the answer signal (step 5020).

According to some further embodiments of the present invention, gateway 2200 may condition the output signal monitor 2220 to detect fax/modem/text signals from the network (step 5030).

According to some embodiments of the present invention, in the event of detecting an originating signal from the data network (step 5100), gateway 2200 may discriminate the call mode and call type, in accordance with originating and answer signals (step 5200).

According to some embodiments of the present invention, gateway 2200 may decide at this point whether to relay the complete call by using XoIP protocol or continue in the current (VoIP/VBD) mode (step 5300). If gateway 2200 is unable to relay a complete call then the gateway will continue the current VoIP/VBD operation (step 5400)

According to some embodiments of the present invention, gateway 2200 decided to relay the call may send a synthetic answer signal to the network by using the current VoIP/VBD protocol (step 5500). According to further embodiments of the present invention, the synthetic answer signal is free of echo components or any other disturbing components and may result in a better communication session.

According to some further embodiments of the present invention, gateway 2200 decided to relay the call, may start a generation of synthetic originating signal towards TE (step 5510) and re-configure the gateway's receiver 2210 to detect a corresponding response signal from TE. According to yet further embodiments of the present invention, the signal generated according to the step 5510 may significantly differ from an original signal detected by the output signal monitor (2220). As well, the signal transmitted to TE may be a silence.

According to some embodiments of the present invention, upon detection of a next answer or silence signal from TE (step 5520), gateway 2200 may initiate the selected XoIP relay mode (step 5530). The detected next answer signal may be relayed over the network (2400) to a remote gateway (2500) by using the initiated XoIP protocol (step 5540). Continuing the generation 5510 to TE, the gateway executes a XoIP connection procedure (step 5600) similarly to the procedure 3600 described above.

Figure 6:
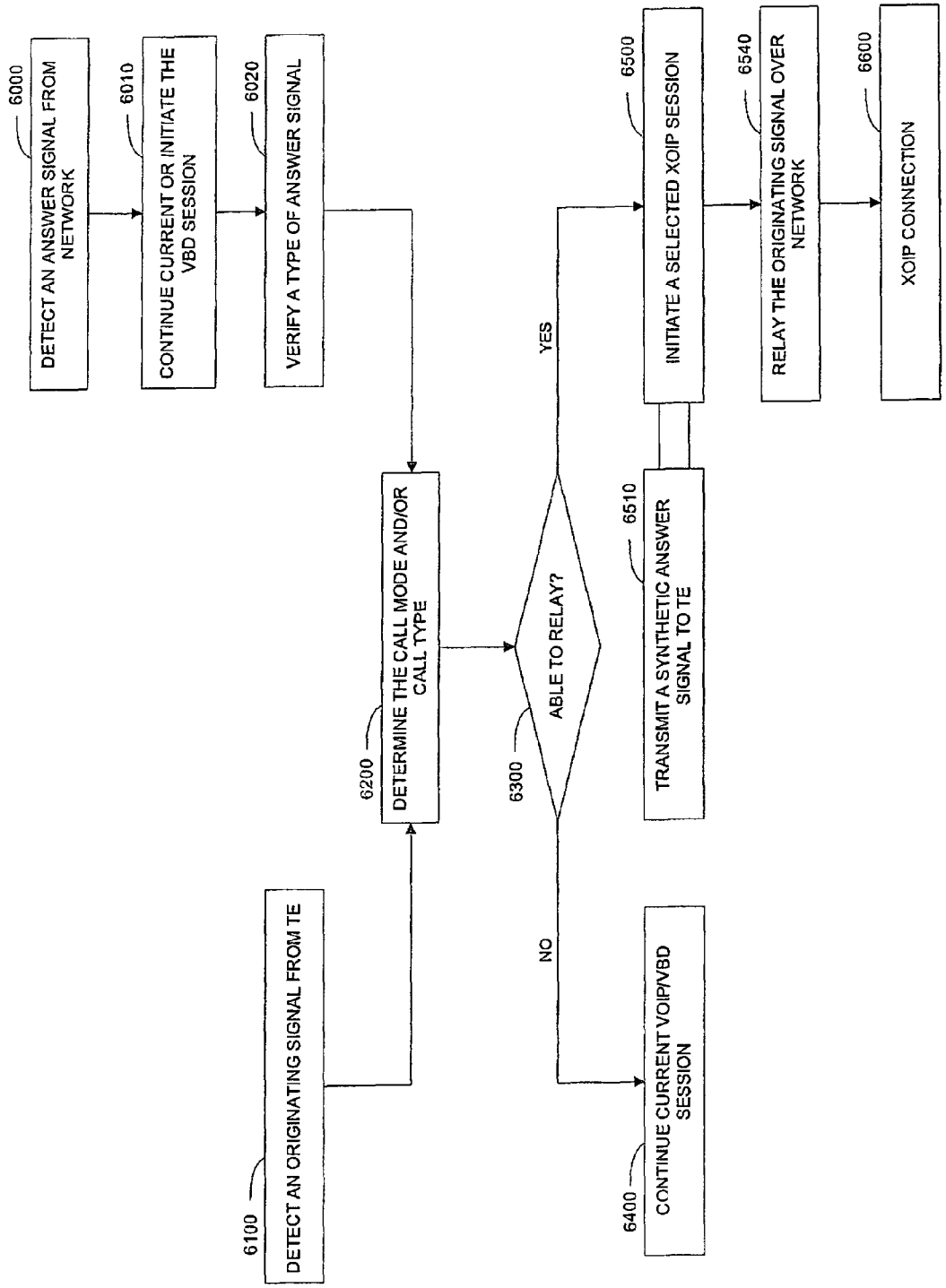
FIG. 6 is a flowchart including the steps of a method of establishing a XoIP (FoIP/MoIP/ToIP) call during full-duplex communication handshake for invention gateway connected to an originating terminal equipment (TE) in accordance with some embodiments of the present invention.

Turning now to FIG. 6 there is shown the steps of establishing a XoIP (FoIP/MoIP/ToIP) call during full-duplex communication handshake for invention gateway connected to an originating terminal equipment (TE). According to some embodiments of the present invention, gateway 2200 when monitoring (2220) the output signal toward TE 2000 may detect an answer signal received from the data network (FIG. 6 step 6000). According to some further embodiments of the present invention, gateway 2200 may initiate a VBD transfer mode (step 6010).

According to some embodiments of the present invention, gateway 2200 may monitor the answer signal, as shown in step 6020, and define call mode as "answering".

According to some further embodiments of the present invention, upon detection of an originating signal from TE (step 6100), gateway 2200 may discriminate the call type according to the combination of originating and answer signals (step 6200).

According to some embodiments of the present invention, gateway 2200 may decide, after determining call type, whether to switch to XoIP protocol or stay in VoIP/VBD mode (step 6300). If gateway 2200 is unable to relay a complete call then the gateway will continue the current VoIP/VBD operation (step 6400). According to further embodiments of the present invention, if gateway 2200 is capable to relay the call it may initiate a communication session according to the selected XoIP protocol (step 6500).

According to some embodiments of the present invention, during transition to XoIP protocol, gateway 2200 may re-generate and transmit synthetic answer signal to TE (step 6510), in accordance with detected parameters and selected XoIP protocol.

According to some further embodiments of the present invention, the detected originating signal may be relayed over the network (2400) to a remote gateway (2500) by using the initiated XoIP protocol (step 6540). Continuing the generation 6510 to TE, the gateway executes a XoIP connection procedure (step 6600) similarly to the procedure 3600 described above.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A communication gateway comprising:
 a media gateway able to be connected at a first side to a data network, and able to be connected at a second, opposite, side to a Terminal Equipment (TE), wherein the TE and the media gateway are located at a same side of said data network; and
 a bi-directional analog signal monitor comprised within said communication gateway;
 wherein the bi-directional analog signal monitor is operative within said communication gateway to bi-directionally monitor contra-propagating analog signals transferred using Voice-over-Internet-Protocol (VoIP) or using Voice Band Data (VBD) protocol, and wherein the bi-directional analog signal monitor comprises:
  an input signal monitor to detect within said communication gateway fax/modem/textphone analog signals in real time in a first direction being from the TE towards the media gateway, and
  an output signal monitor to detect within said communication gateway fax/modem/textphone analog signals in real time in a second direction being from a media gateway VoIP or VBD decoder towards the TE;

wherein, upon detection of a fax/modem/textphone analog signal in the first direction or in the second direction, the media gateway is operative, by utilizing the bi-directional analog signal monitor, to autonomously determine a call mode as either answering mode or originating mode;

wherein the media gateway is (a) to autonomously perform fax/modem/textphone call discrimination based on a combination of contra-propagating analog signals in said first direction and in said second direction detected by using said bi-directional analog signal monitor autonomously not relying on signaling negotiation with another media gateway, and (b) based on said fax/modem/textphone call discrimination, to autonomously initiate a transition from (i) a protocol selected from the group consisting of VoIP and VBD, to (ii) non-voice XoIP protocol selected from the group consisting of Fax-over-Internet-Protocol (FoIP), Modem-over-Internet-Protocol (MoIP), Text-over-Internet-Protocol (ToIP).

2. The communication gateway according to claim 1, wherein said media gateway is adapted to initiate a transition from VoIP mode to VBD mode upon detecting a negotiation signal which is selected from the group consisting of: fax negotiation signal, modem negotiation signal, textphone negotiation signal,
in a direction selected from the group consisting of: (i) direction from the TE towards the media gateway; (ii) direction from the media gateway VoIP decoder towards the TE.

3. The communication gateway according to claim 2, wherein said media gateway is adapted to use a combination of signals detected in two contra-propagating directions for configuring a VBD signal and packet processing appropriate for fax/modem/textphone calls.

4. The communication gateway according to claim 2, wherein the media gateway is adapted (A) to perform a transition from VoIP mode to VBD mode upon detecting a negotiation signal in direction from the media gateway VoIP decoder towards the TE, and (B) to re-generate the detected signal towards a connected TE.

5. The communication gateway according to claim 1, wherein the media gateway is adapted to initiate transition from (i) VoIP mode or VBD mode, to (ii) XoIP protocol selected from the group consisting of FoIP, MoIP, ToIP, in accordance with a half-duplex communication handshake detected as combination of (a) a handshake initiating signal received in the direction from the media gateway VoIP or VBD decoder towards the TE, and (b) a response signal received in the direction from the TE towards the media gateway.

6. The communication gateway according to claim 1, wherein the media gateway is adapted to initiate transition from (i) VoIP mode or VBD mode, to (ii) XoIP protocol selected from the group consisting of FoIP, MoIP, ToIP, in accordance with a half-duplex communication handshake detected as combination of (a) a handshake initiating signal received in the direction from the TE towards the media gateway, and (b) a response signal received in the direction from the media gateway VoIP or VBD decoder towards the TE.

7. The communication gateway according to claim 1, wherein the media gateway is adapted to initiate transition from (i) VoIP mode or VBD mode, to (ii) XoIP protocol selected from the group consisting of FoIP, MoIP, ToIP, in accordance with a full-duplex communication handshake detected as combination of (a) an answer signal received in the direction from the media gateway VoIP or VBD decoder towards the TE, and (b) an originating signal received in the direction from the TE towards the media gateway.

8. The communication gateway according to claim 1, wherein the media gateway is adapted to initiate transition from (i) VoIP mode or VBD mode, to (ii) XoIP protocol selected from the group consisting of FoIP, MoIP, ToIP, in accordance with a full-duplex communication handshake detected as combination of (a) an answer signal received in the direction from the TE towards the media gateway, and (b) an originating signal received in the direction from the media gateway VoIP or VBD decoder towards the TE.

9. The communication gateway according to claim 1, wherein the media gateway which is adapted to initiate transition from (i) VoIP or VBD, to (ii) XoIP protocol selected from the group consisting of FoIP, MoIP, ToIP, is further adapted to generate a synthetic signal or silence, and forward it to a fax/modem/textphone TE, respectively, or encode and forward it to data network.

10. The communication gateway according to claim 1, wherein the media gateway is to discriminate and establish fax, modem, or textphone calls (a) without utilizing a Media Gateway Controller (MGC), and (b) without utilizing an auxiliary Media-Gateway-to-Media-Gateway (MG-to-MG) signaling protocol.

11. A method of communication, wherein the method is implemented using at least a media gateway of a communication gateway able to be connected at a first side to a data network, and able to be connected at a second, opposite, side to a Terminal Equipment (TE), wherein the TE and the media gateway are located at a same side of said data network;
said method comprising:
at a bi-directional analog signal monitor associated with said media gateway, and comprised within said communication gateway and operative within said communication gateway to bi-directionally monitor contra-propagating analog signals transferred using Voice-over-Internet-Protocol (VoIP) or using Voice Band Data (VBD) protocol, detecting fax/modem/textphone analog signals in real time in a first direction being from the TE towards the media gateway, and
detecting within said communication gateway fax/modem/textphone analog signals in real time in a second direction being from a media gateway VoIP or VBD decoder towards the TE;
wherein, upon detection of a fax/modem/textphone analog signal in said first direction or in said second direction, the method comprises, by utilizing said bi-directional analog signal monitor, autonomously determining a call mode as either answering mode or originating mode;
wherein the method further comprises: at the media gateway, (a) autonomously performing fax/modem/textphone call discrimination based on a combination of contra-propagating analog signals in said first direction and in said second direction detected by using said bi-directional analog signal monitor autonomously not relying on signaling negotiation with another media gateway, and (b) based on said fax/modem/textphone call discrimination, autonomously initiating a transition from (i) a protocol selected from the group consisting of VoIP and VBD, to (ii) non-voice XoIP protocol selected from the group consisting of Fax-over-Internet-Protocol (FoIP), Modem-over-Internet-Protocol (MoIP), Text-over-Internet-Protocol (ToIP).

12. The method according to claim 11, comprising:
initiating by the media gateway a transition from VoIP mode to VBD mode upon detecting a negotiation signal which is selected from the group consisting of: fax negotiation signal, modem negotiation signal, textphone negotiation signal, in a direction selected from the group consisting of: (i) direction from the TE towards the media gateway; (ii) direction from the media gateway VoIP decoder towards the TE.

13. The method according to claim 12, wherein the media gateway is adapted to use a combination of signals detected in two-contra-propagating directions for configuring a VBD signal and packet processing appropriate for fax/modem/textphone calls.

14. The method according to claim 12, comprising:
detecting a negotiation signal in direction from the media gateway VoIP decoder towards the TE;
upon said detecting, performing by the media gateway a transition from VoIP mode to VBD mode, and re-generating the detected signal towards a connected TE.

15. The method according to claim 11, wherein the method comprises, at the media gateway, initiating a transition selected from the group consisting of:
(A) transition from (i) VoIP mode or VBD mode, to (ii) XoIP protocol selected from the group consisting of FoIP, MoIP, ToIP, in accordance with a half-duplex communication handshake detected as combination of (a) a handshake initiating signal received in the direction from the media gateway VoIP or VBD decoder towards the TE, and (b) a response signal received in the direction from the TE towards the media gateway;
(B) transition from (i) VoIP mode or VBD mode, to (ii) XoIP protocol selected from the group consisting of FoIP, MoIP, ToIP, in accordance with a half-duplex communication handshake detected as combination of (a) a handshake initiating signal received in the direction from the TE towards the media gateway, and (b) a response signal received in the direction from the media gateway VoIP or VBD decoder towards the TE.

16. The method according to claim 11, wherein the method comprises, at the media gateway, initiating a transition selected from the group consisting of:
(A) transition from (i) VoIP mode or VBD mode, to (ii) XoIP protocol selected from the group consisting of FoIP, MoIP, ToIP, in accordance with a full-duplex communication handshake detected as combination of (a) an answer signal received in the direction from the media gateway VoIP or VBD decoder towards the TE, and (b) an originating signal received in the direction from the TE towards the media gateway;
(B) transition from (i) VoIP mode or VBD mode, to (ii) XoIP protocol selected from the group consisting of FoIP, MoIP, ToIP, in accordance with a full-duplex communication handshake detected as combination of (a) an answer signal received in the direction from the TE towards the media gateway, and (b) an originating signal received in the direction from the media gateway VoIP or VBD decoder towards the TE.

17. The method according to claim 11, wherein the media gateway is adapted to initiate transition from (i) VoIP or VBD, to (ii) XoIP protocol selected from the group consisting of FoIP, MoIP, ToIP, wherein the method further comprises: generating by the media gateway a synthetic signal or silence, and forward it to a fax/modem/textphone TE, respectively, or encode and forward it to data network.

18. The method according to claim 11, comprising:
discriminating and establishing fax, modem, or textphone calls (a) without utilizing a Media Gateway Controller (MGC), and (b) without utilizing an auxiliary Media-Gateway-to-Media-Gateway (MG-to-MG) signaling protocol.

* * * * *